(12) United States Patent
Kalaboukis

(10) Patent No.: US 11,195,214 B1
(45) Date of Patent: Dec. 7, 2021

(54) AUGMENTED REALITY VALUE ADVISOR

(71) Applicant: Wells Fargo Bank, N.A., San Francisco, CA (US)

(72) Inventor: Chris Kalaboukis, San Jose, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 134 days.

(21) Appl. No.: 16/815,918

(22) Filed: Mar. 11, 2020

Related U.S. Application Data

(63) Continuation of application No. 15/346,344, filed on Nov. 8, 2016, now Pat. No. 10,636,063.

(51) Int. Cl.
| | |
|---|---|
| *G06Q 30/00* | (2012.01) |
| *G06Q 30/02* | (2012.01) |
| *G06T 19/00* | (2011.01) |
| *G06F 3/01* | (2006.01) |
| *G06Q 40/08* | (2012.01) |
| *G06K 9/00* | (2006.01) |
| *G06Q 30/06* | (2012.01) |
| *G06F 16/583* | (2019.01) |
| *G06Q 30/08* | (2012.01) |

(52) U.S. Cl.
CPC ......... *G06Q 30/0283* (2013.01); *G06F 3/017* (2013.01); *G06F 16/583* (2019.01); *G06K 9/00214* (2013.01); *G06Q 30/0643* (2013.01); *G06Q 30/08* (2013.01); *G06Q 40/08* (2013.01); *G06T 19/006* (2013.01)

(58) Field of Classification Search
CPC ........... G06Q 30/0283; G06Q 30/0643; G06Q 30/08; G06Q 40/08; G06F 16/583; G06F 3/017; G06K 9/00214
See application file for complete search history.

(56) References Cited

U.S. PATENT DOCUMENTS

| | | |
|---|---|---|
| 8,224,718 B1 | 7/2012 | Sholtis et al. |
| 8,965,460 B1 | 2/2015 | Rao et al. |
| 9,020,838 B2 | 4/2015 | Herwig |
| 9,092,774 B2 | 7/2015 | Becorest et al. |
| 9,153,074 B2 | 10/2015 | Zhou et al. |

(Continued)

FOREIGN PATENT DOCUMENTS

WO 2015134740 A1 9/2015

OTHER PUBLICATIONS

Zhu, Wei, et al. "Personalized in-store e-commerce with the promopad: an augmented reality shopping assistant." Electronic Journal for E-commerce Tools and Applications 1.3 (2004): 1-19. (Year: 2004).*
Chung et al., "Adaptive cloud offloading of augmented reality applications on smart devices for minimum energy consumption," KSII Transactions on Internet and Information Systems, vol. 9, Issue 8 (Aug. 2015), 12 pages.

(Continued)

*Primary Examiner* — Matthew E Zimmerman
(74) *Attorney, Agent, or Firm* — Merchant & Gould P.C.

(57) ABSTRACT

A method for determining a value of an item includes receiving an image of a first item captured as a result of focusing an augmented reality (AR) device on the first item. The image of the first item is compared with images of one or more second items from a database. An image of one of the second items is identified that closely corresponds to the image of the first item. Metadata is obtained for the one of the second items. Using the metadata, value information is obtained for the first item. The value information is permitted to be displayed on the AR device.

11 Claims, 6 Drawing Sheets

100

(56) References Cited

U.S. PATENT DOCUMENTS

| | | | |
|---|---|---|---|
| 9,240,074 | B2 | 1/2016 | Berkovich et al. |
| 9,317,171 | B2 * | 4/2016 | Chiu .................... G06F 3/0488 |
| 9,361,501 | B2 | 6/2016 | Molisimo et al. |
| 2004/0193529 | A1 | 9/2004 | Asher et al. |
| 2007/0021991 | A1 | 1/2007 | Etzioni et al. |
| 2008/0071559 | A1 | 3/2008 | Arrasvuori |
| 2013/0293580 | A1 | 11/2013 | Spivack |
| 2014/0092241 | A1 | 4/2014 | Brinkman et al. |
| 2014/0129374 | A1 | 5/2014 | Pradeep |
| 2014/0175162 | A1 | 6/2014 | Argue et al. |
| 2014/0340423 | A1 | 11/2014 | Taylor et al. |
| 2015/0046289 | A1 | 2/2015 | Carey et al. |
| 2015/0100445 | A1 | 4/2015 | Johnson et al. |
| 2015/0262412 | A1 | 9/2015 | Gruber et al. |
| 2016/0063611 | A1 | 3/2016 | Davis et al. |
| 2016/0093000 | A1 | 3/2016 | Pevzner et al. |
| 2017/0163882 | A1 * | 6/2017 | Piramuthu ............... G06K 9/00 |
| 2017/0270582 | A1 * | 9/2017 | Forss .................. G06K 9/6273 |
| 2018/0005208 | A1 * | 1/2018 | Aggarwal ............ G06Q 20/321 |

OTHER PUBLICATIONS

Google Inc., "Google Goggles," accessed at https://play.google.com/store/apps/details?id=com.google.android.apps.unveil&hl=en, May 28, 2014, 3 pages.

Digital Trends, "Get past the gimmicks and gaze upon the future of augmented reality apps," accessed at http://www.digitaltrends.com/mobile/future-ar-mobile/, Mar. 15, 2014, 8 pages.

Hempel, Jessi, "Project Hololens: Our exclusive hands-on with Microsoft's Holographic Goggles," WIRED, accessed at http://www.wired.com/2015/01/microsoft-hands-on/, Jan. 21, 2015, 15 pages.

Gribetz, Meron, "A glimpse of the future through an augmented reality headset," accessed at https://www.metavision.com/, Jun. 20, 2016, 8 pages.

Vusix, "M100 Smart Glasses," accessed at https://www.vuzix.com/Products/m100-smart-glasses, Jun. 20, 2016, 2 pages.

Jimeno-Morenilla et al., "Augmented and Virtual Reality techniques for footwear," Computers in Industry, vol. 64, Issue 9 (Dec. 2013), 5 pages.

* cited by examiner

AUGMENTED REALITY VALUE ADVISOR

BACKGROUND

Individuals often want to know a value of items in their possession. However, it is sometimes difficult to determine an accurate assessment of the value. Information regarding a current value of the items may be difficult to obtain, the information may not be accurate and the value of the items can fluctuate over time. These limitations can impact an individual's ability to assess and dispose of items the individual may no longer need and/or want.

SUMMARY

Embodiments of the disclosure are directed to a method for determining a value of an item, the method comprising: receiving an image of a first item captured as a result of focusing an augmented reality (AR) device on the first item; comparing the image of the first item with images of one or more second items from a database; identifying an image of one of the second items that closely corresponds to the image of the first item; obtaining metadata for the one of the second items; using the metadata, obtaining value information for the first item; and permitting the value information to be displayed on the AR device.

In another aspect a method implemented on an augmented reality (AR) device for determining and displaying a value of items displayed on the AR device comprises: focusing the AR device on an item; as a result of focusing the AR device on the item, receiving an image of the item captured on the AR device; receiving value information for the item; and displaying the value information near the item on the AR device.

In yet another aspect, an electronic computing device comprises: a processing unit; and system memory, the system memory including instructions which, when executed by the processing unit, cause the electronic computing device to: receive a three-dimensional (3D) image of a first item from an augmented reality (AR) device; compare the 3D image of the first item with 3D images of one or more second items from a database; identify a 3D image of one of the second items that matches the 3D image of the first item; obtain metadata for the one of the second items; using the metadata, access one or more retail computer systems to obtain value information for the first item, the value information comprising a current price for the first item and a trend in a price for the first item; send the value information to the AR device; and receiving from the AR device a request to list the first item for sale.

The details of one or more techniques are set forth in the accompanying drawings and the description below. Other features, objects, and advantages of these techniques will be apparent from the description, drawings, and claims.

DETAILED DESCRIPTION

Figure 1:
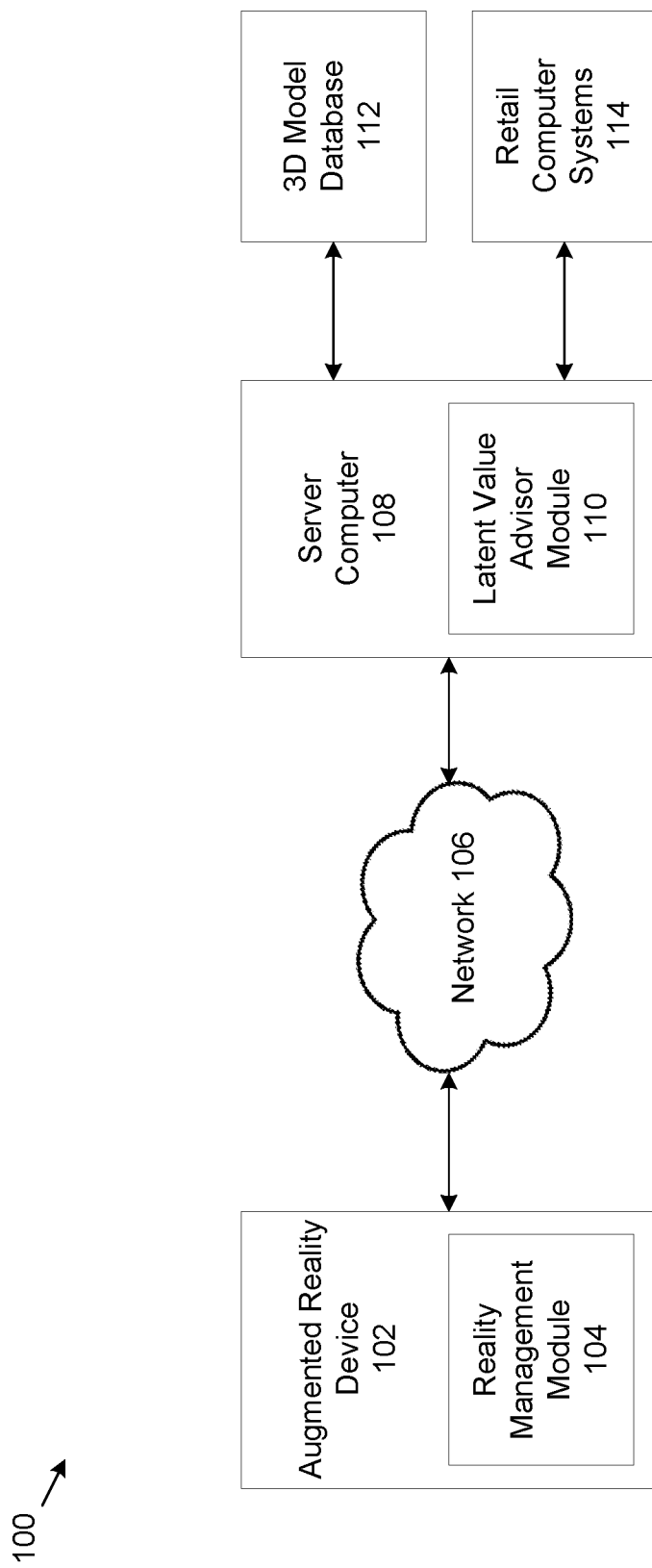
FIG. 1 shows an example system that supports a latent value advisor on an augmented reality (AR) device.

The present disclosure is directed to systems and methods for assessing a possible value of items for an individual. In some examples, the value is assessed using a software application being executed on a computing device. The software application is programmed to allow the individual to assess the "latent" value associated with one or more items.

In one example, the software application is referred to as a "latent value advisor" being executed on a computing device. The latent value advisor can obtain a current value of items in a field of view of a computing device, such as an augmented reality (AR) computing device, and display the current value on the AR device.

In one example implementation, the AR device can capture an image of a view of an item, create a 3-dimensional (3D) representation of the item and send the 3D representation of the item to an electronic computing device, such as a server computer. The server computer can access a 3D model database and attempt to find an image on the 3D model database that matches the 3D representation of the item. The server computer can then attempt to obtain pricing information for the item corresponding to the matching image from the 3D model database and send the pricing information to the AR device. When a user of the AR device decides that, based on the price, the user wishes to sell the item, the item can be listed for sale.

In another example implementation, the AR device can capture the image of the view of the item, create the 3D representation of the item and directly access the 3D model database and attempt to find an image on the 3D model database that matches the 3D representation of the item. The AR device can then attempt to obtain pricing information for the item corresponding to the matching image from the 3D model database. When the user of the AR device decides that, based on the price, the user wishes to sell the item, the item can be listed for sale.

The systems and methods can also be used to provide an inventory of items at the individual's home or workplace. The individual can focus the AR device on an item and an image of the item can be captured by a camera on the AR device. The image of the item can be sent to the server computer and identified by attempting to match the image with other images on the 3D model database. When the item is identified, the item can be inventoried on the server computer. Images of the item may need to be taken from different angles in order to create an adequate 3D image of the item for matching purposes. In some implementations, the item can be identified at the AR device instead of on the server computer.

When attempting to match the 3D representation of the item with other images on the 3D model database, when the item cannot be identified definitively, the individual can be presented with a plurality of images of items that come close to matching the item. The individual can then choose which of the plurality of images may be a best match. In addition, variations may be found in matching items. For example, one possible match for the item may be red, another possible match may be green and a third possible match may be blue. Imperfections in a possible match can also be presented to the individual. For example one possible match may have a mark on it and other possible match may not have a mark on it. The individual can select which possible match may be a best match.

In some implementations, a process of inventorying items can be automated. For example, the inventorying of items in the individual's home can be inventoried automatically at periodic intervals, for example one a month. When scanning is activated, as the individual walks through the individual's home, items in the home can be automatically scanned and inventoried.

The server computer can obtain a current value of the item and also can obtain values of the item over time. The server computer can calculate a trend of a price of the item and provide the trend to the individual. The individual can use the current value of the item and the trend of the price of the item to help the individual decide whether to sell the item.

The item can be offered for sale on an online site such as eBay. The item can also be offered at an auction site. When offered at an auction site, the server computer can obtain a current bid for the item and display the current bid on the AR device. The current bid can be displayed at a close proximity to the item on the AR device.

The current value of the item can also be used to capture a resale value of the item for insurance purposes. As items are inventoried, the items can be checked against a current resale value and used to provide a current insurance valuation of the individual's possessions.

The systems and methods can also be used to obtain a re-sell price for an item before the individual purchases the item. For example, the individual can scan an item at a garage sale with the AR device. Based on an image of the scanned item, the server computer can send a current retail price for the item to the individual at the AR device. The current retail price can be, for example, a price of what a similar item is being offered for on a web site such as eBay. The individual can decide how much to pay for the item at the garage sale based on the current retail price for the item.

In some implementations, a notification can be sent to the individual when the price of the item changes to a price specified by the individual. For example, if a current price of the item is $100, the individual can request a notification to be sent when the price increases to $150. A notification can also be provided based on a financial status of the individual. For example, if a financial institution knows that the individual is interested in a vacation trip to Hawaii but cannot currently afford the vacation trip, the financial institution can determine that if one or more items in the individual's home are sold, the individual can obtain enough money to fund the vacation trip. The financial institution can provide this information in a message to the individual. In addition, the individual can decide that based on a dollar amount needed to fund a specific purchase, some items may need to be sold at less than an optimum value based on the need to obtain funds at a specific time.

In an example implementation using the systems and methods, a customer of a financial institution who is wearing an AR headset can use a camera on the AR headset to scan a room. For example, the room can be a living room of the customer's home and can include items such as a sofa, chairs, tables, lamps, a high-definition television, a piano and other items. As the items are scanned, 3D representations of each item can be sent to a server computer for analysis. The server computer can compare the 3D representation of each item with reference objects stored in a 3D model database. When a match is found, metadata can be obtained for the reference object that can identify an item. For example, the metadata can indicate a name and description of the item. The server computer can use the metadata to query retail computer systems to obtain current and historical data regarding a value for each item. The server computer can also run predictive analysis on a pricing model for the item and determine trends in a price for the item. The server computer can then send data regarding the value and price of the item to the AR headset.

The AR headset can display value and price data as an overlay image near the item as viewed by the AR headset. The customer can hand gesture left and right at the item to view prices over time. For example gesturing left at the item can display past prices of the item and gesturing right at the item can display an estimate of future prices for the item. If the customer wishes to list the item for sale, the customer can gesture towards the item. Once the item is listed, an indicator can be presented over the item indicating that the item has been listed for sale and the price at which it has been listed. The customer can also choose to have the item listed on an auction site, and when an auction site is selected, a current bid on the item on the auction site can also be displayed near the item on the AR headset.

As an example of a use of the latent value advisor, a user can wish to purchase insurance for items in his home. The user can put on an AR headset and run a latent value advisor application on the AR headset. As the user looks around his home, a camera on the AR headset can focus on individual items and highlight the items. When the user gestures at an item, a 3D image can be captured for the item and the item can be placed into an inventory. The 3D image can be sent to a server computer to determine the type of the item and a current value for the item. As the user moves from room to room in his home, more items can be focused on and added to the inventory. The AR headset can display a total cost of insurance for the items in the inventory. When the user scans a new item, for example a nice antique armoire in his bedroom, the user notices that the total insurance cost increases significantly. The armoire happens to be rare and has a retail price of around $10,000 on a secondary market such as eBay. When the user gestures at the armoire, the AR headset displays a current price for the armoire on eBay for $10,400 and rising. The user decides to sell the armoire by gesturing and confirming a listing for the armoire. When the armoire is listed, the AR headset shows that the total insurance cost for the user for the items in the user's home is reduced by an amount of insurance to cover the armoire.

The systems and methods disclosed herein are directed to a computer technology that can improve an efficiency of conducting online commerce for a user of an AR device. The system and methods permit a current value of an item that the user may want to sell to be displayed on the AR device as a result of focusing the AR device on the item. When the current value is known, the user can use the AR device to automatically list the item for sale on an online website such as eBay. In addition, the systems and methods permit a financial institution of the user to suggest scenarios for selling one or more user items in order to finance known goals for the user. The financial institution can suggest the scenarios based on a scan of items in the home of the user with the AR device and knowledge of a current price of the items.

FIG. 1 shows an example system 100 that can support a latent value advisor on an AR device. The latent value advisor can obtain a current value of objects in a field of view of the AR device. The system 100 can include an AR device 102, a network 106, a server computer 108, a 3D model database 112 and retail computer systems 114. AR device 102 includes a reality management module 104.

Server computer 108 includes a latent value advisor module 110. More than one AR device 102, server computer 108 and 3D model database 112 can be used.

The example AR device 102 is an electronic computing device that supports augmented reality. Augmented reality is a live view of a real-world environment that is overlaid with computer-generated input such as sound, video and graphics. The AR device 102 can be a stand-alone device or an electronic computing device such as a smartphone or tablet computer that includes an augmented reality software application. The stand-alone AR device can comprise a headset, similar to eyeglasses, which may be worn by the user. One example of an AR headset is Google Glass, from Google Inc. of Mountain View, Calif. Another example of an AR headset is Microsoft HoloLens, from Microsoft Corporation of Redmond, Wash. More than one AR device can be used.

The headset can include a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability.

The example reality management module 104 manages AR device 102 and presents an appropriate experience to the user, based on information obtained by server computer 108. As discussed in more detail later herein, the reality management module 104 can display and value information for items in a field of view of AR device 102. As used in this disclosure, value information can include a price at which an item can be sold and trends in a price for the item, including previous prices for the item and predicted future prices for the item.

The example network 106 is a computer network such as the Internet. A user of AR device 102 can access server computer 108 across network 106.

The example server computer 108 is a server computer at an organization that can obtain value information for retail items. For example, server computer 108 can be a server computer at a financial institution at which the user is a customer and has one or more financial accounts. The financial institution can provide a latent value advisor software application as a service to its customers. As another example, server computer 108 can be a server computer at a website that can provide a latent value advisor software application for customers who access the website. Other examples are possible.

The example latent value advisor module 110 includes functionality for identifying items from 3D images of the items, for obtaining value and pricing information for the items, for listing the items for sale at third party sites and other functionality. The latent value advisor module 110 is described in more detail later herein.

The example 3D model database 112 comprises a database that store 3D representations of objects. Metadata describing identification details of each object is stored along with each object. The database can be a public or a private database, such as a retail database. More than one 3D model database 112 can be used.

The example retail computer systems 114 comprise one or more electronic computing devices such as server computers that store or can access value and pricing information regarding retail objects. In an example implementation, the retail computer systems 114 can have one or more application programming interfaces (APIs) from which functionality on the retail computer systems 114 can be accessed.

Figure 2:
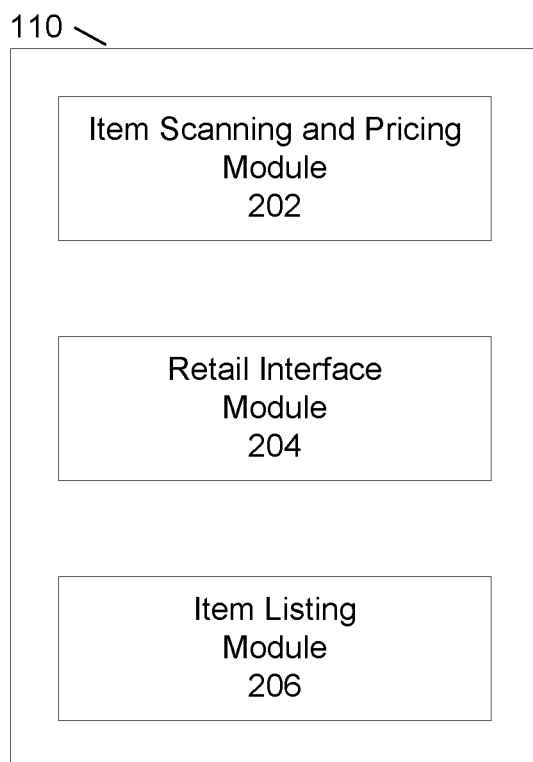
FIG. 2 shows example modules of the latent value advisor module of FIG. 1.

FIG. 2 shows example modules of the latent value advisor module 110. The latent value advisor module 110 includes an item scanning and pricing module 202, a retail interface module 204 and an item listing module 206. More, fewer or different modules can be included.

The example item scanning and pricing module 202 receives 3D images of objects from AR device 102 and attempts to identify the objects so that value and pricing information can be obtained for the objects. The scanning and pricing module 202 can scan 3D model database 112 for both used and new versions of each object. When a match is obtained, metadata from the match can be used to identify the object. The scanning and pricing module 202 can use the metadata to query retail computer systems 114 and obtain value and pricing information for the object. Once obtained, the scanning and pricing module 202 can use the value and pricing information to determine pricing trends for the object and to predict a future price for the object. The item scanning and pricing module 202 can also receive a sell request for the object from AR device 102 and send the sell request to item listing module 206.

The example retail interface module 204 provides calls to one or more APIs at retail computer systems 114. Each API permits a functional command to be executed at the retail computer systems 114. The APIs can be used to obtain value and pricing information for items for which a match is obtained at the item scanning and pricing module 202. The APIs can also be used to place items for sale at the retail computer systems 114. Other uses for the APIs are possible.

The example item listing module 206 can list items which the user decides to sell via an interconnection with APIs on the retail interface module 204. When the item listing module 206 makes a determination that the user at AR device 102 wants to list an item for sale, the item listing module 206 can send a request to retail interface module 204 to list the item on one of retail computer systems 114. As discussed earlier herein, retail interface module 204 can use one or more APIs on the retail computer systems 114 to list the item for sale.

Figure 3:
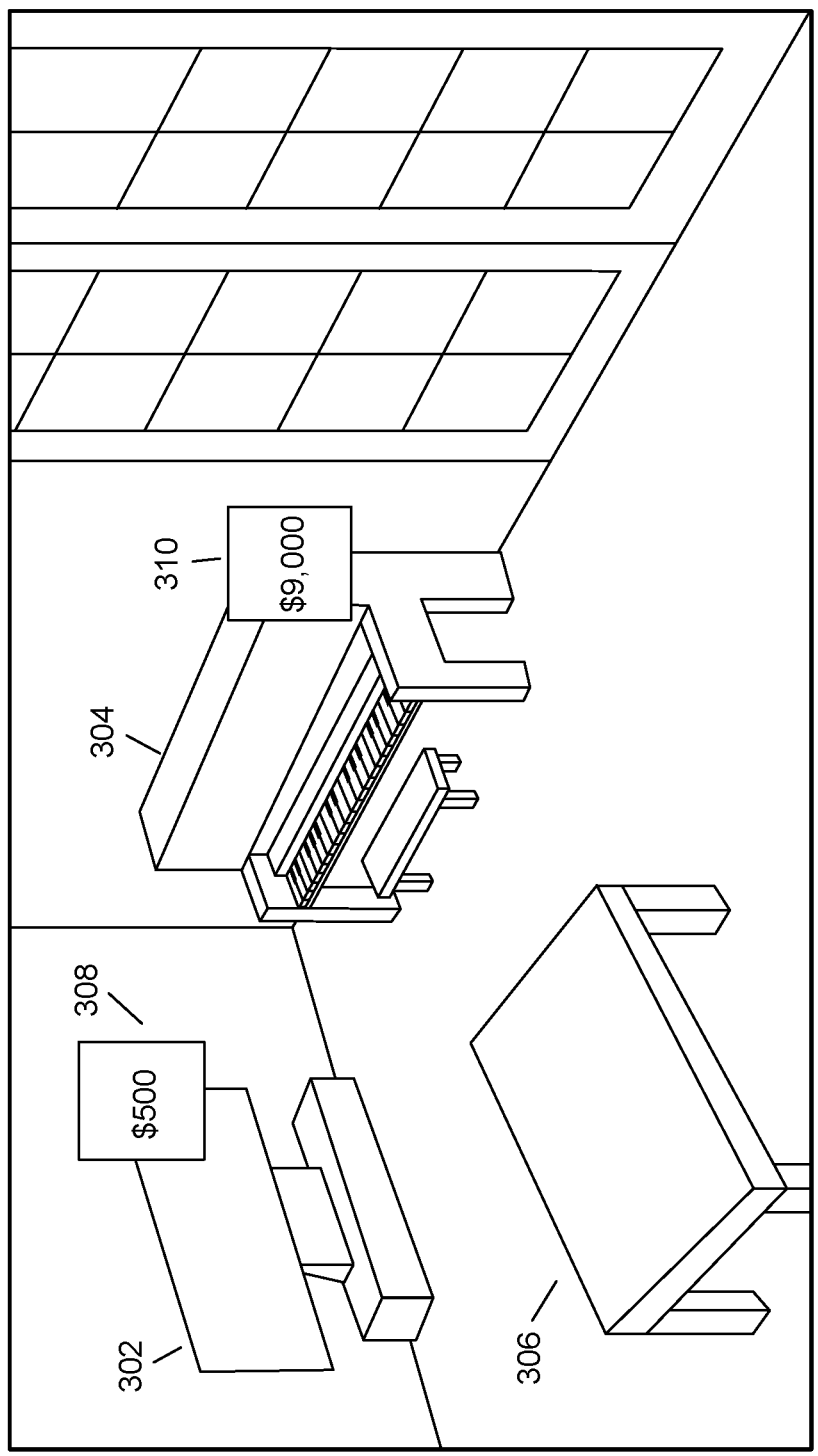
FIG. 3 shows an example scene viewed on the AR device of FIG. 1.

FIG. 3 shows an example scene 300 as viewed on AR device 102. The example scene 300 is an example view of the user's living room. As shown in FIG. 3, the example living room includes a high-definition television (HDTV) 302, a piano 304 and a table 306. Also shown are price displays 308 and 310. Price display 308 and price display 310 are floating images that can be placed in close proximity of HDTV 302 and piano 304, respectively.

When the user gestures to HDTV 302, server computer 108 obtains pricing information for HDTV 302. The pricing information can include a current price of HDTV 302. When AR device 102 receives the pricing information, the reality management module 104 can render price display 308, showing a current price of $500 for HDTV 302. Similarly, when the user gestures to the piano 304, the reality management module 104 can render price display 310, showing a current price of $9,500 for piano 304.

In addition, other information can be placed in price displays 308 and 310. For example, when the user decides to list HDTV 302 or piano 304 for sale, the listing price can be displayed. In addition, if the user decides to put HDTV 302 or piano 304 up for auction, a current bid price at an auction site can be displayed.

Figure 4:
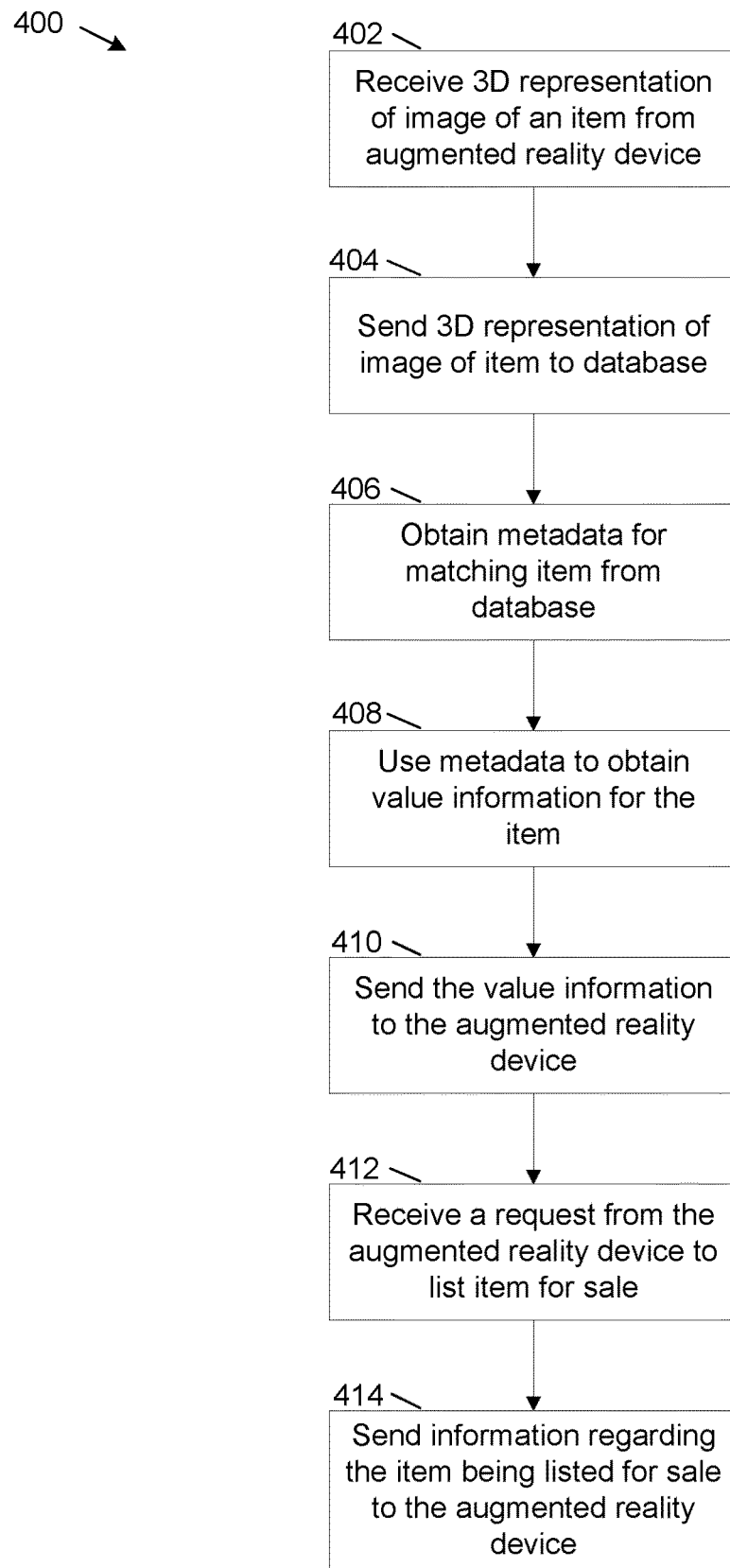
FIG. 4 shows a method for determining a value of an item viewed with the AR device of FIG. 1.

FIG. 4 shows a flowchart of an example method 400 at a server computer for determining a value of an item viewed with an AR device. For method 400, the server computer is server computer 108 and the AR device is AR device 102.

At operation 402, a 3D representation of an image captured at AR device 102 is received at server computer 108. The image is one that is in a field of view of a user of AR device 102 and is captured by a camera on AR device 102.

At operation 404, the 3D representation of the image is sent to a database, for example to 3D model database 112. The 3D model database 112 attempts to match the received image to an image stored on 3D model database 112.

At operation 406, metadata is obtained for an item that matches or closes corresponds to the received image on 3D model database 112. The metadata can include items such as a name and description for the item and a product code for the item, such as a uniform product identifier, and other metadata items.

At operation 408, the metadata is used to obtain value information for the item. Server computer 108 can access one or more of retail computer systems 114 to obtain information regarding a current price of the item and regarding a trend in a price of the item.

At operation 410, the value information obtained at operation 408 is sent to AR device 102.

At operation 412, a request is received from AR device 102 to list the item for sale. The request is obtained as a result of the user on AR device 102 selecting the item to be listed for sale.

At operation 414, information regarding the item being listed for sale is sent to AR device 102. The information can include a price at which the item is being listed, a date at which the item is listed, an initial asking price for the item at an auction site, a current bid for the item at the auction site and other information.

Figure 5:
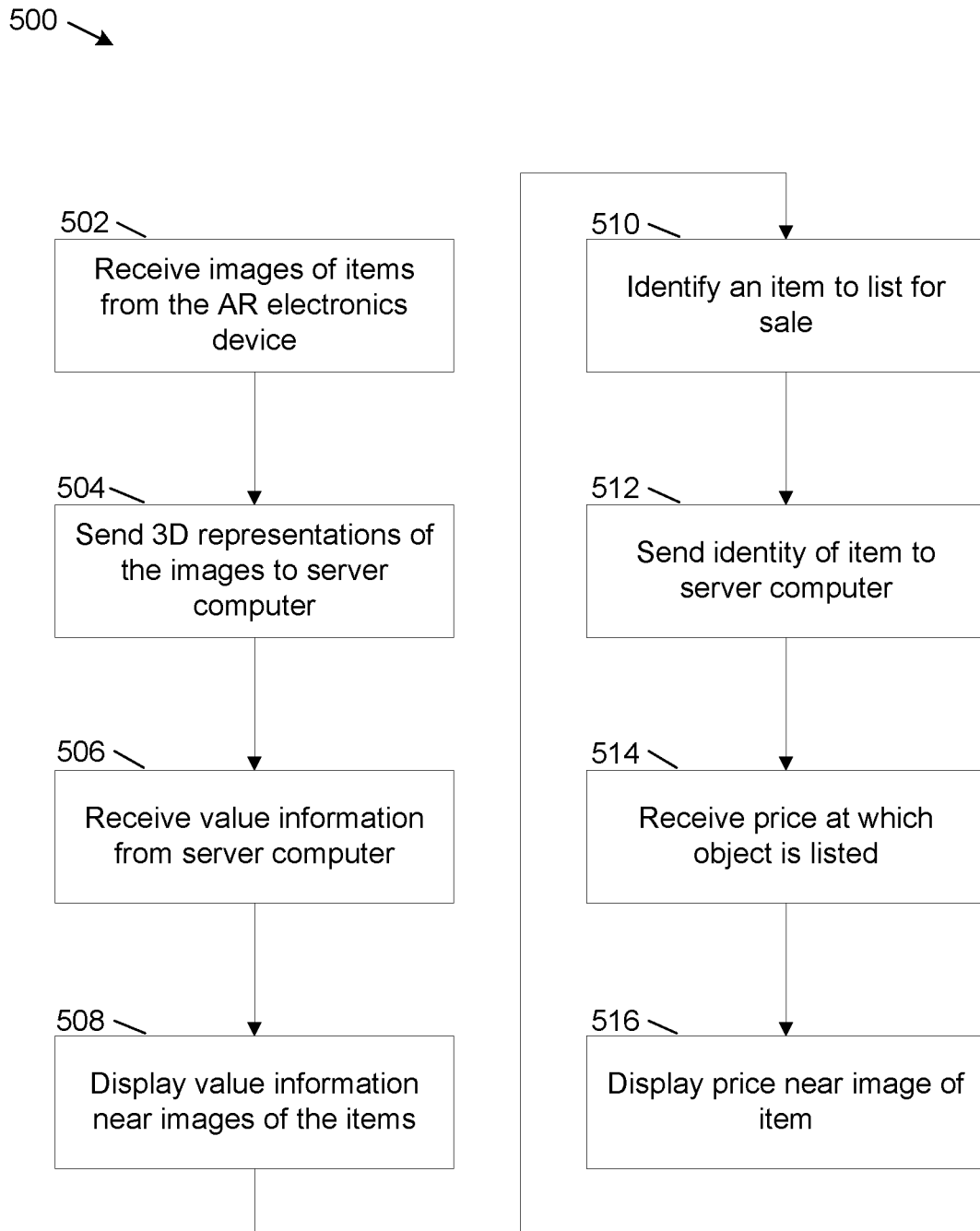
FIG. 5 shows a method for displaying pricing information for items viewed with the AR device of FIG. 1.

FIG. 5 shows a flowchart of an example method 500 for displaying value information for items viewed with an AR device. The pricing information is obtained via one or more retail computer systems, such as retail computer systems 114. For method 500, the AR device is AR device 102 and a server computer used to access retail computer systems 114 is server computer 108.

At operation 502, images captured by a camera on AR device 102 are received at AR device 102. The images can comprise one or more items in a field of view of AR device 102. The images can be received as a result of a user of AR device 102 focusing on each object and issuing a verbal command such as price or gesturing at each item. The images can also be received based on an automatic program at AR device 102 than can automatically capture images of each item in the field of view of AR device 102.

At operation 504, 3D representations of the items are sent to server computer 108.

At operation 506, value information regarding the items is obtained from server computer 108. The value information is obtained from retail computer systems 114 and can include a current price of an item and trends in a price of an item.

At operation 508, the value information is displayed near the images of the items as viewed on AR device 102. The value information for each object can be displayed as an overlay of the image of the object on AR device 102.

At operation 510, an item that is to be listed for sale is identified. The item to be listed for sale can be identified by focusing on the item with AR device 102 or gesturing towards the item and issuing a verbal command such as "list for sale" or "submit for auction."

At operation 512, a message is sent to server computer 108 indicating an identity of the item to be listed for sale and whether the item is to be submitted for auction.

At operation 514, a price at which the item is listed for sale or information regarding the item at an auction site is received from server computer 108. The information regarding the item at the auction site can include a current bid for the item and a listing of previous bids so that a trend in the bid price can be determined. Other auction site information is possible.

At operation 516. The price information from operation 514 is displayed on AR device 102 near the item.

Figure 6:
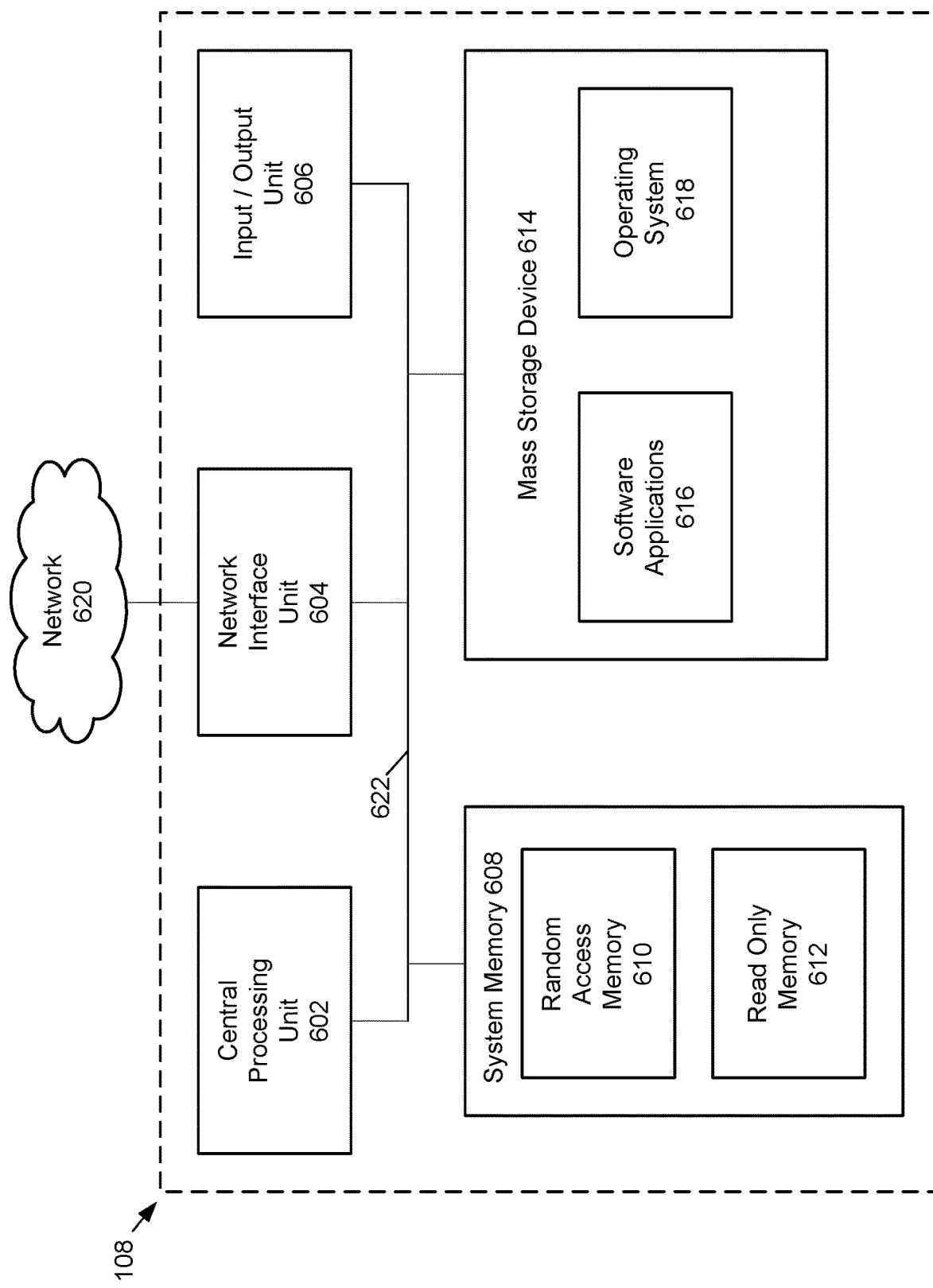
FIG. 6 shows example physical components of the server computer of FIG. 1.

As illustrated in the example of FIG. 6, server computer 108 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the server computer 108, such as during startup, is stored in the ROM 612. The server computer 108 further includes a mass storage device 614. The mass storage device 614 is able to store software instructions and data. Some or all of the components of the server computer 108 can also be included in AR device 102.

The mass storage device 614 is connected to the CPU 602 through a mass storage controller (not shown) connected to the system bus 622. The mass storage device 614 and its associated computer-readable data storage media provide non-volatile, non-transitory storage for the server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 108.

According to various embodiments of the invention, the server computer 108 may operate in a networked environment using logical connections to remote network devices through the network 620, such as a wireless network, the Internet, or another type of network. The server computer 108 may connect to the network 620 through a network interface unit 604 connected to the system bus 622. It should be appreciated that the network interface unit 604 may also be utilized to connect to other types of networks and remote computing systems. The server computer 108 also includes an input/output controller 606 for receiving and processing input from a number of other devices, including a touch user interface display screen, or another type of input device.

Similarly, the input/output controller 606 may provide output to a touch user interface display screen or other type of output device.

As mentioned briefly above, the mass storage device 614 and the RAM 610 of the server computer 108 can store software instructions and data. The software instructions include an operating system 618 suitable for controlling the operation of the server computer 108. The mass storage device 614 and/or the RAM 610 also store software instructions, that when executed by the CPU 602, cause the server computer 108 to provide the functionality of the server computer 108 discussed in this document. For example, the mass storage device 614 and/or the RAM 610 can store software instructions that, when executed by the CPU 602, cause the server computer 108 to display received data on the display screen of the server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for using an augmented reality (AR) device to capture a three dimensional (3D) image of a first item and help determine a value of the first item, the method comprising:
   receiving the 3D image of the first item from the AR device;
   comparing, by at least one computing device, the 3D image of the first item with 3D images of one or more items from a database;
   identifying, by the at least one computing device, a 3D image of a second item from the one or more items that matches the 3D image of the first item;
   obtaining, in response to the identifying, metadata for the second item;
   obtaining, based on the metadata, value information for the first item;
   calculating a trend of the value information for the first item using predictive analysis on a pricing model for the first item;
   rendering the value information on the AR device as an overlay of the 3D image of the first item; and
   in response to receiving a hand gesture, overlaying the trend of the value information in proximity to the first item as viewed by the AR device.

2. The method of claim 1, further comprising rendering the value information on the AR device near a location of the 3D image of the first item.

3. The method of claim 1, further comprising obtaining a current price for the first item.

4. The method of claim 1, further comprising accessing one or more retail computer systems to obtain the value information for the first item.

5. The method of claim 4, further comprising sending commands to one or more application programming interfaces (APIs) on the one or more retail computer systems to obtain the value information for the first item.

6. The method of claim 1, further comprising receiving a request to list the first item for sale.

7. The method of claim 6, further comprising receiving a request to list the first item for sale on an auction site.

8. The method of claim 7, further comprising:
   receiving a current bid for the first item from the auction site; and permitting the current bid for the first item to be displayed on the AR device.

9. The method of claim 1, wherein the database is a 3D model database.

10. The method of claim 1, further comprising:
    receiving images of one or more additional items captured as a result of focusing the AR device on the one or more additional items;
    obtaining value information for the one or more additional items; and
    based on the value information, identifying one or more of the one or more additional items that a user of the AR device can sell to obtain funds.

11. An electronic computing device comprising:
    a processing unit; and
    system memory, the system memory including instructions which, when executed by the processing unit, cause the electronic computing device to:
      receive a three-dimensional (3D) image of a first item from an augmented reality (AR) device;
      compare the 3D image of the first item with 3D images of one or more second items from a database;
      identify a 3D image of one of the second items that matches the 3D image of the first item;
      obtain metadata for the one of the second items;
      using the metadata, access one or more retail computer systems to obtain value information for the first item, the value information comprising a current price for the first item and a trend in a price for the first item;
      calculate a trend of the value information for the first item using predictive analysis on a pricing model for the first item;
      send the value information and the trend to the AR device;
      render the value information on the AR device as an overlay of the 3D image, near a location of the first item on the 3D image;
      in response to receiving a hand gesture, overlay the trend of the value information in proximity to the first item as viewed by the AR device; and
      receive from the AR device a request to list the first item for sale.

\* \* \* \* \*